United States Patent
Hujer

(10) Patent No.: US 10,486,768 B2
(45) Date of Patent: Nov. 26, 2019

(54) HAND-ACTUATED TRANSMITTER UNIT

(71) Applicant: Gustav Magenwirth GmbH & Co. KG, Bad Urach (DE)

(72) Inventor: Joachim Hujer, Grabenstetten (DE)

(73) Assignee: Gustav Magenwirth GmbH & Co. KG, Bad Urach (DE)

( * ) Notice: Subject to any disclaimer, the term of this patent is extended or adjusted under 35 U.S.C. 154(b) by 0 days.

(21) Appl. No.: 14/825,262

(22) Filed: Aug. 13, 2015

(65) Prior Publication Data

US 2016/0046350 A1    Feb. 18, 2016

(30) Foreign Application Priority Data

Aug. 14, 2014  (DE) .................... 10 2014 111 641

(51) Int. Cl.
*B62K 23/06*    (2006.01)
*B62L 3/02*    (2006.01)

(52) U.S. Cl.
CPC .............. *B62L 3/023* (2013.01); *B62K 23/06* (2013.01)

(58) Field of Classification Search
CPC ................................ B62L 3/023; B62K 23/06
See application file for complete search history.

(56) References Cited

U.S. PATENT DOCUMENTS

| | | | |
|---|---|---|---|
| 4,779,482 A * | 10/1988 | Kawaguchi ............ | B62K 23/02 188/196 BA |
| 5,813,501 A | 9/1998 | Terry, Sr. | |
| 6,318,514 B1 | 11/2001 | Hinkens et al. | |
| 2007/0283774 A1* | 12/2007 | Lavezzi ................. | B62K 23/06 74/40 |
| 2008/0053085 A1* | 3/2008 | Weiher .................... | B60T 7/108 60/568 |
| 2009/0205330 A1 | 8/2009 | Dunlap, III | |
| 2009/0301252 A1* | 12/2009 | Hsu ........................ | B62K 23/06 74/489 |
| 2011/0155525 A1* | 6/2011 | Yang ....................... | B60T 7/102 188/344 |
| 2012/0125143 A1* | 5/2012 | Thomas ................... | G05G 1/04 74/522 |
| 2012/0161420 A1* | 6/2012 | Eberlein ................ | B60T 11/18 280/288.4 |

FOREIGN PATENT DOCUMENTS

| | | |
|---|---|---|
| DE | 10 2013 200 824 A1 | 7/2014 |
| EP | 1894802 A2 | 3/2008 |
| WO | WO 2006/070417 A1 | 7/2006 |

\* cited by examiner

*Primary Examiner* — Vicky A Johnson
(74) *Attorney, Agent, or Firm* — Reinhart Boerner Van Deuren P.C.

(57) ABSTRACT

In order to configure a hand-actuated transmitter unit for vehicles, in particular for handlebar-controlled vehicles, comprising a housing, a master cylinder provided in the housing, an actuating lever which is movable relative to the housing and a plunger which transmits a movement of the actuating lever to the master cylinder and which is mounted on the actuating lever, to be as economical and functional as possible, it is proposed that provided on the housing is a reach adjust device for the actuating lever, with which a respective starting position of the actuating lever is presettable.

26 Claims, 15 Drawing Sheets

HAND-ACTUATED TRANSMITTER UNIT

CROSS-REFERENCE TO RELATED PATENT APPLICATION

This patent application claims the benefit of German application No. 10 2014 111 641.0, filed Aug. 14, 2014, the teachings and disclosure of which are hereby incorporated in their entirety by reference thereto.

BACKGROUND OF THE INVENTION

The invention relates to a hand-actuated transmitter unit for vehicles, in particular for handlebar-controlled vehicles, comprising a housing, a master cylinder provided in the housing, an actuating lever which is movable relative to the housing and a plunger which transmits a movement of the actuating lever to the master cylinder and which is mounted on the actuating lever.

Hand-actuated transmitter units of this type are known from the prior art.

It is an object of the invention to configure a transmitter unit of this type to be as economical and functional as possible.

SUMMARY OF THE INVENTION

This object is achieved according to the invention with a transmitter unit of the aforementioned type in that provided on the housing is a reach adjust device for the actuating lever, with which a respective starting position of the actuating lever is pre-settable.

The advantage of the solution according to the invention is to be found therein that, by means of such a reach adjustment, the current user of the hand-actuated master cylinder device can set the starting position of the actuating lever relative to the handlebar that is favourable for him, in particular a starting position that is favourable for a hand of the user.

Preferably, such a reach adjust device is configured so that it comprises an adjustment element which is movable relative to the housing and with which the respective starting position is settable. The adjustment element can be arranged or mounted on the housing to be movable in highly varied ways.

For example, it is conceivable to mount the adjustment element rotatable on the housing, so that by rotating the adjustment element, different starting positions of the actuating lever are pre-settable.

A solution that is advantageous with regard to the design and particularly the space requirement provides that the adjustment element is displaceably arranged on the housing.

Such a displaceable arrangement of the adjustment element relative to the housing has the advantage that with this arrangement, the space requirement for the reach adjust unit can be kept small.

A particularly favourable solution provides that the adjustment element can be brought into different positions relative to the pivot axis of the actuating lever, having different spacings from the pivot axis, defining the different starting positions which themselves correspond to different reaches.

With regard to the configuration of the adjustment element itself, no detailed indications have so far been given.

In particular, no detailed indications have been given regarding the cooperation of the adjustment element with the actuating lever for setting the different starting positions.

Thus, an advantageous solution provides that the adjustment element has at least one stop surface for a contact arm of the actuating lever.

In this regard, the at least one stop surface could be configured so that it is a surface that is continuously varying and particularly therefore providing different angular spacings of the actuating lever from a holding unit, on which surface the contact arm lies for setting the different starting positions on different surface regions.

A particularly advantageous embodiment provides that the adjustment element has different stop surfaces which particularly set different angular spacings of the actuating lever from a holding unit and which are associated with different starting positions of the actuating lever.

For example, such different stop surfaces can be configured as surfaces or surface regions offset relative to one another with which the contact arm cooperates in each starting position.

In this case, it is suitably provided that by means of the movement of the adjustment element, one of the respective stop surfaces can be brought into an active position cooperating with the contact arm in which a setting of the respective starting position of the actuating lever takes place.

With regard to the definition of the different positions of the adjustment element for reaching the different starting positions of the actuating lever, no detailed indications have been given in the context of the description above of the individual exemplary embodiments.

For example, it is conceivable to provide a self-locking adjusting device.

Another possibility is to fix the adjustment element in different positions, for example, with a screw.

A particularly favourable solution provides that the adjustment element of the reach adjust device is fixable in the different positions by means of a locking device.

The advantage of this solution lies therein that a tool-free reach adjustment is possible particularly easily since the locking device can be configured so that it permits the achievement of the different positions tool-free and thus purely manually.

In particular it is herein provided that the locking device comprises two cooperating locking elements of which one is connected to the housing and another to the adjustment element, so that thereby the adjustment element can be fixed relative to the housing in the different positions in a particularly simple manner.

The locking elements can be configured in widely varying ways.

An advantageous solution provides that a first locking element has a projection and that a second locking element has different locking surfaces for fixing the different positions of the adjustment element.

In this configuration of the locking elements, the projection preferably cooperates with one of the respective locking surfaces to fix the relevant position and, in order to achieve different positions, the projection is moved to the different locking surfaces.

With regard to the execution of the locking movement, no detailed indications have been given in the context of the configuration of the locking elements.

Thus, it is suitably provided that one of the locking elements comprises a resilient tongue which enables the locking elements to move relative to one another from one locking position into another locking position.

Preferably, in the solution according to the invention, the second locking element is connected to the adjustment element and the first locking element is connected to the housing.

It is suitably further provided that the second locking element comprises the resilient tongue which carries the plurality of locking surfaces.

Furthermore, no detailed indications have been given in the context of the above solution also concerning the arrangement of the adjustment element on the housing.

Thus, an advantageous solution provides that the adjustment element is guided by means of a guide on the housing and is thus movable in a defined manner in a guide direction relative to the housing.

For example the guide is configured so that it comprises on one hand guide bodies and on the other hand guide grooves wherein the guide direction is pre-defined by the guide grooves.

For example, it is provided that the adjustment element, the guide bodies and the guide grooves are arranged on the housing.

With regard to the guide direction for the movability of the adjustment element, no detailed indications have so far been given.

Thus a particularly compactly designed solution provides that the adjustment element is movable through the guide in a guide direction approximately parallel to the master cylinder, so that the housing can be formed small and compact.

Approximately parallel should be understood herein to mean that the deviation of the guide direction from a parallel course is 20° or less.

Alternatively or in addition to the previously described features, the object described in the introduction is achieved according to the invention with a transmitter unit of the type described in the introduction in that the plunger is adjustable relative to the actuating lever by means of a threaded guide, in that the threaded guide comprises an external thread provided on the plunger, said thread engaging in an internal thread arranged statically on the pressure arm of the actuating lever, in that the plunger comprises a rotary control element and in that, arranged on the actuating lever is a first locking element which cooperates with a second locking element provided on the plunger and defines individual rotary positions of the plunger.

The advantage of this solution according to the invention is that a solution is thereby achieved which is particularly easy to realise and is reliable with regard to functional safety.

It is herein particularly favourable if the second locking element is connected to the rotary control element so that the second locking element is also rotatable by means of the rotary control element.

A still simpler and advantageous solution provides that the second locking element is formed onto the rotary control element.

A particularly advantageous solution provides that the second locking element is formed by the rotary control element itself.

This solution is particularly advantageous since it does not require a separate part as the second locking element, but rather the second locking element can be formed by the rotary control element itself, for example, by means of grip recesses of the control element itself, so that a solution is provided that is both economical and space-saving.

With regard to the configuration of the first locking element, no detailed indications have so far been given.

An advantageous solution provides that the first locking element comprises a locking nose.

The locking nose could be arranged, for example, statically on the actuating lever and the second locking element for example could be formed with the necessary flexibility so that it can deform in order to enable different locking positions of the first locking element relative to the second locking element.

A particularly favourable solution provides that the first locking element comprises a resilient tongue which carries the locking nose.

With a resilient tongue of this type, the possibility exists of realising the resilient movement for the locking of the first locking element and the second locking element in different positions by means of the first locking element.

For example, herein the resilient tongue could be configured as desired relative to the actuating lever.

If, for example the actuating lever is made of metal, it is provided that the resilient tongue is held on the actuating lever, for example, by clamping, riveting or screw fastening.

A particularly favourable solution provides that the first locking element is formed integrally onto the actuating lever.

In the case of an actuating lever made of any desired materials, this is easily realised if the first locking element is not to carry out any resilient movement relative to the second locking element.

In the case of a first locking element which is to carry out a resilient movement, it is suitably provided in this case that the actuating lever is made of a material which permits the configuration of the resiliently movable locking element.

This is the case, for example, if the actuating lever is made of plastics.

Furthermore, it is suitably provided, for the configuration of the first locking element so that it can carry out a resilient movement relative to the actuating lever, that the first locking element is movable into a recess of the actuating lever in order, for example, to be able to carry out a resilient diversion during the transition between different locking positions of the second locking element.

This solution can also be realised in a particularly easy and space-saving manner if the actuating element is made of plastics.

With regard to the exemplary embodiments described so far, no details have been given concerning how the actuating lever should be held in each starting position.

In this regard, it is particularly advantageous if the actuating lever is spring-loaded in the direction of the respective starting position and is thereby held in said position in the non-actuated state, which means that, in the non-actuated state, the actuating lever always transfers automatically into the starting position.

For this purpose, a separate spring unit which moves the actuating lever independently into the respective starting position can be provided.

However, a particularly advantageous solution provides that the actuating lever is acted upon by the master cylinder in the direction of the starting position and thus the master cylinder acts upon the actuating lever such that the actuating lever assumes the respective starting position.

This solution has the further advantage that thereby the respective starting position of the actuating lever simultaneously represents a starting position for the master cylinder.

Thus the starting position of the actuating lever is always associated with a corresponding starting position of the master cylinder.

However, this starting position of the master cylinder can also be set by means of the adjustability of the plunger.

In particular, such an influence of the master cylinder on the actuating lever can be realised in that the master cylinder is provided with a resilient element which acts constantly upon the master cylinder in its direction guiding the actuating lever into the starting position.

Further features and advantages of the invention are the subject matter of the following description and of the illustration in the drawings of some exemplary embodiments.

DETAILED DESCRIPTION OF THE INVENTION

Figure 1:
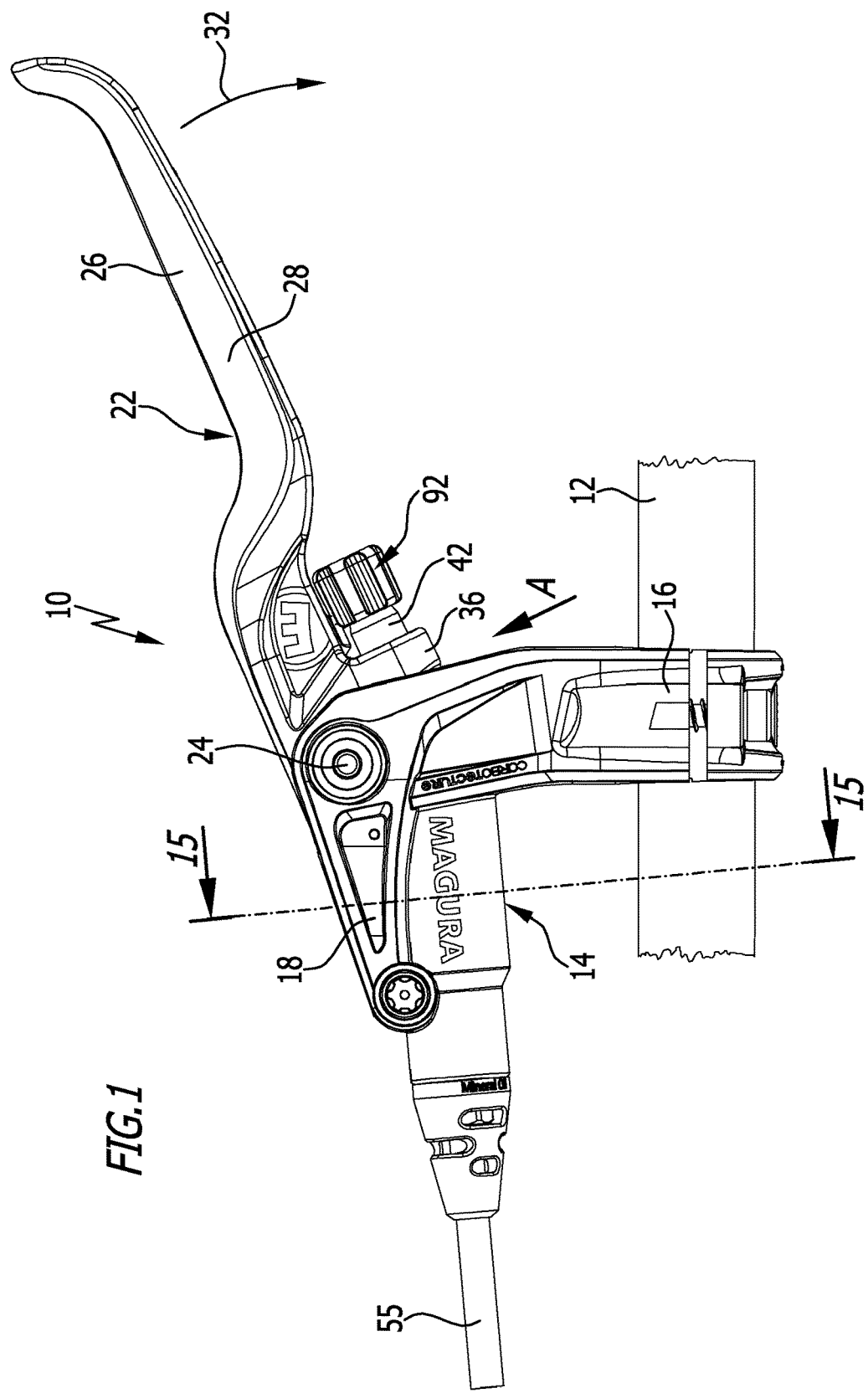
FIG. 1 shows a plan view of a transmitter unit mounted on a portion of a handlebar.

An exemplary embodiment of a transmitter unit 10 according to the invention, as shown in FIG. 1, for vehicles, particularly handlebar-controlled vehicles, comprises a housing 14 mountable on a handlebar 12 of the vehicle, said housing having a holding unit 16 which is clampingly fixable on the handlebar 12.

The housing 14 further comprises a housing body 18 on which an actuating lever 22 is mounted pivotable about a pivot axis 24, wherein the actuating lever 22 has a manually actuatable handle arm 26 with a handle surface 28 for manual actuation of the actuating lever 22, wherein a manual pressure on the handle surface 28 leads to pivoting of the actuating lever 22 in an actuating direction 32 about the pivot axis 24 starting from a starting position.

Figure 2:
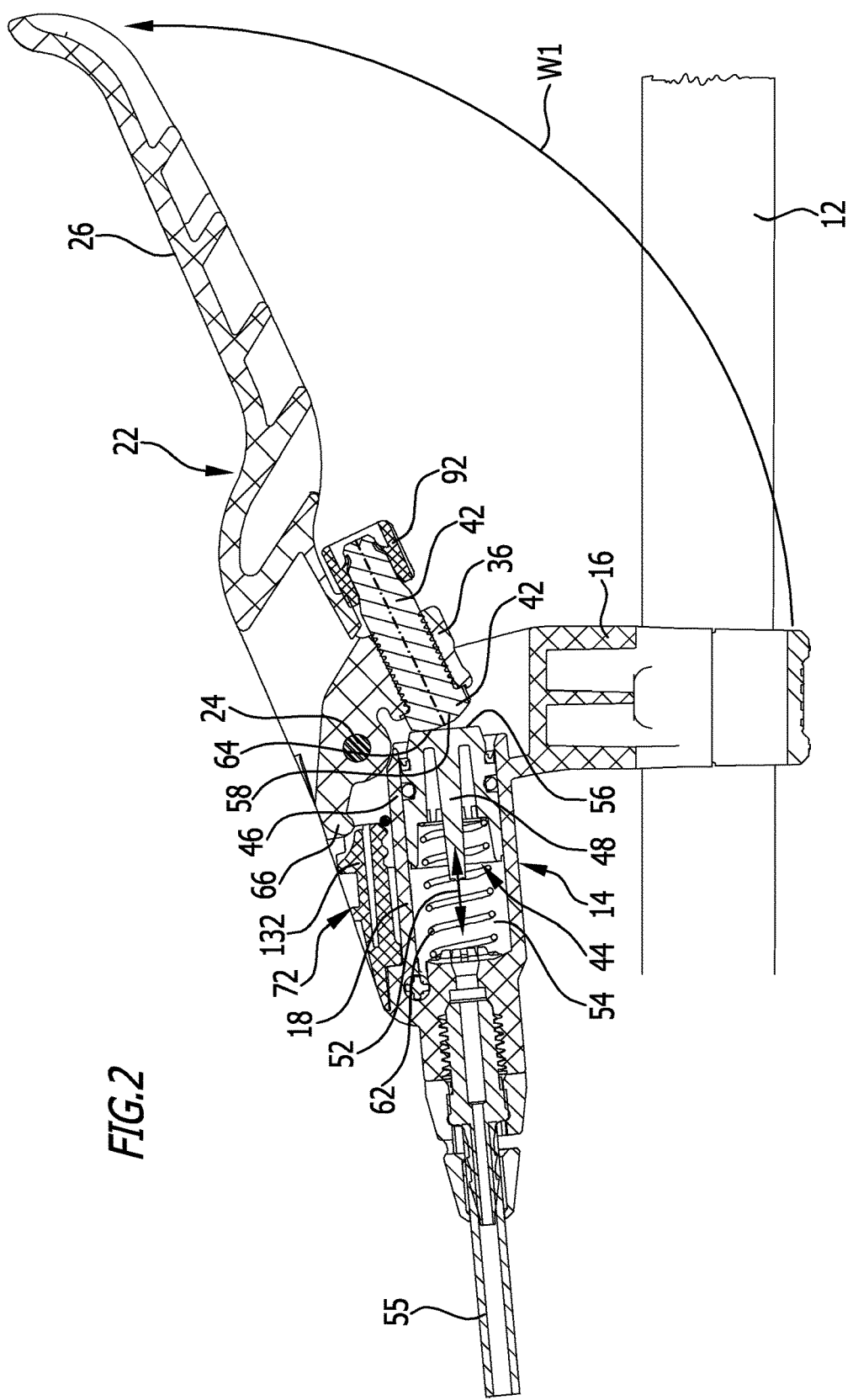
FIG. 2 shows a longitudinal section through the transmitter unit in FIG. 1 in a sectional plane parallel to the drawing plane in FIG. 1.

As FIGS. 1 and 2 show, as well as the handle arm 26, the actuating lever 22 also comprises a pressure arm 36 on which a plunger identified altogether as 42 is mounted.

A master cylinder 44 which is mounted in the housing body 18 is actuable by the plunger 42.

The master cylinder 44 is preferably formed by a cylinder housing 46 arranged, in particular integrally, in the housing body 18, in which cylinder housing a piston 48 is arranged movable in a movement direction 52, wherein the cylinder housing 46 and the piston 48 delimit a cylinder chamber 54 the volume of which varies depending on the position of the piston 48 so that in the event that a hydraulic medium is provided in the cylinder chamber 54, the master cylinder 44 operates as a hydraulic master cylinder by which the hydraulic medium can be fed via a hydraulic line 55 to a slave unit, for example, for actuating a brake unit.

In order to move the piston 48 in the movement direction 52, it is provided with a pressing surface 56 on which the plunger 42 acts with a plunger head 58.

Furthermore, the piston 48 is acted upon in the direction of an end position defining a maximum volume of the cylinder chamber 54 by a compression spring 62 arranged in the cylinder chamber 54 which therefore constantly displaces the piston 48 toward an enlargement of the cylinder chamber 54, so that the piston preferably acts constantly with the pressure surface 56 against a rounded plunger head surface 64 of the plunger head 58 and constantly pivots the actuating lever 22 until a contact arm 66 abuts a reach adjust device 72 which is also provided in the housing 14 and which defines the starting position of the actuating lever 22.

Figure 3:
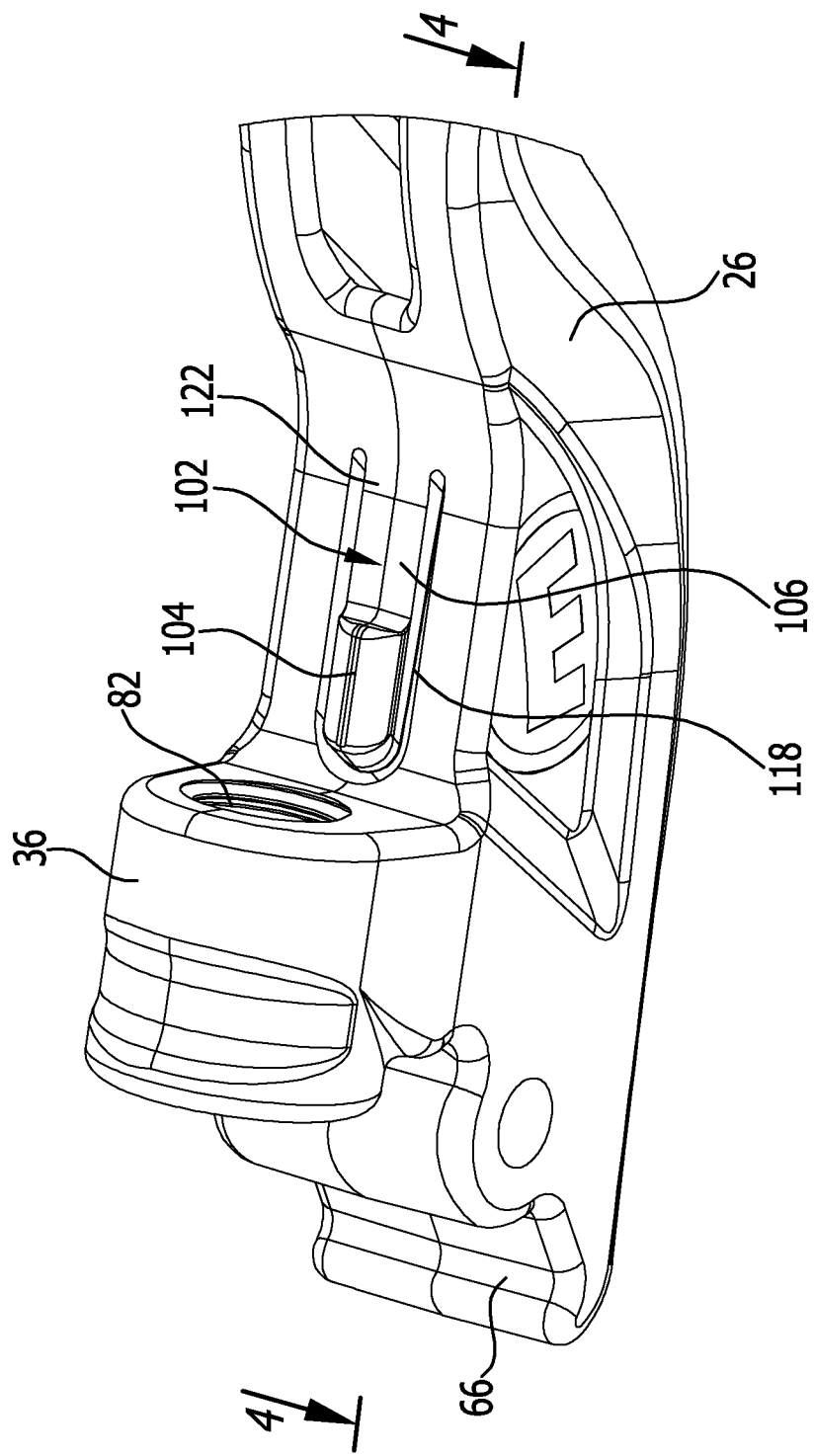
FIG. 3 shows a perspective view of a pressure arm of the actuating lever in the direction of the arrow A in FIG. 1.
Figure 4:
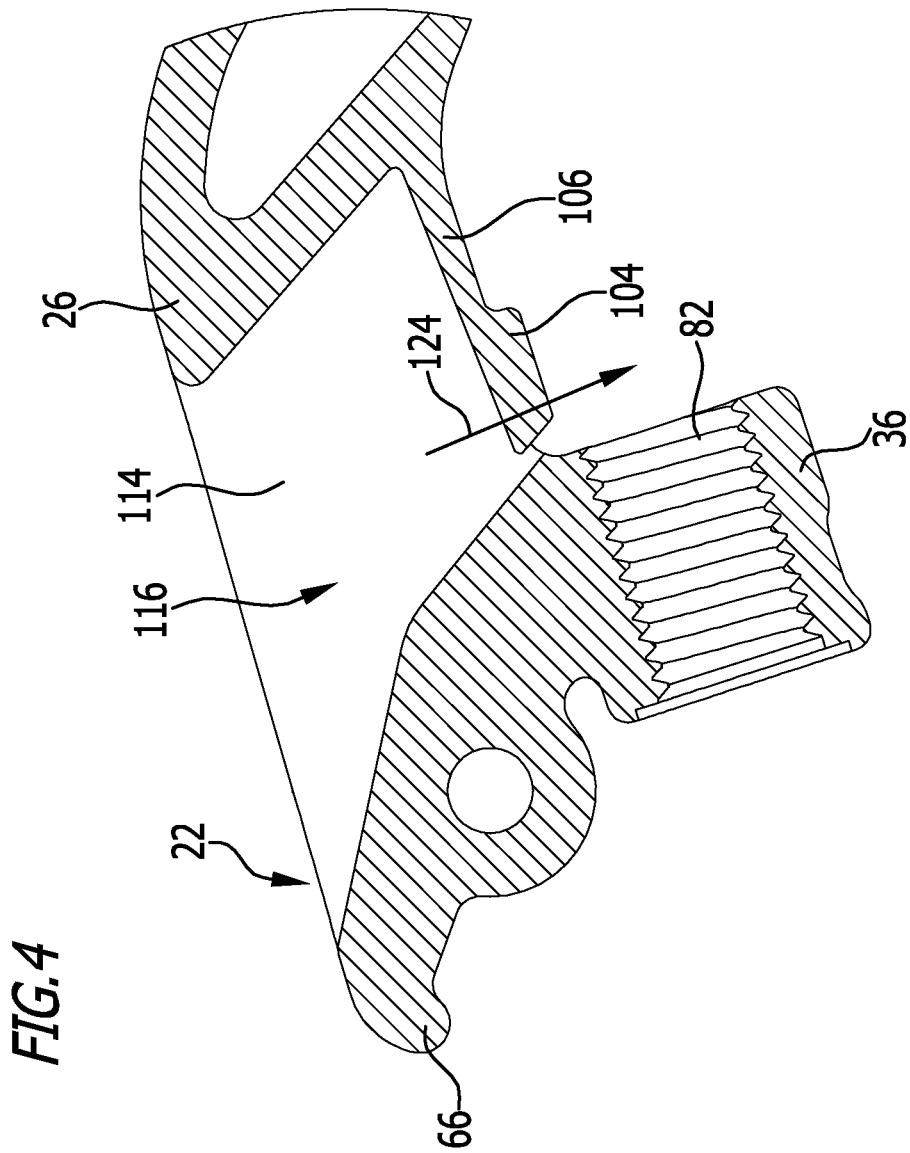
FIG. 4 shows an enlarged longitudinal section through the actuating lever in the region of the pressure arm, but without the plunger.
Figure 5:
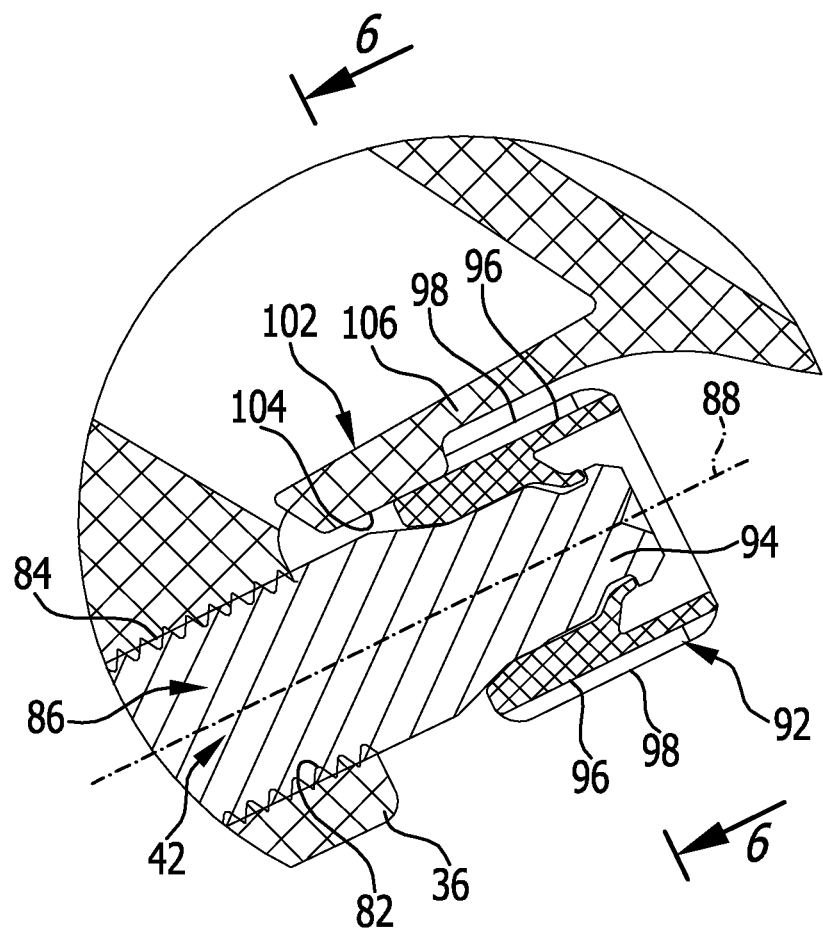
FIG. 5 shows a section similar to FIG. 4 with the plunger.

As shown in FIGS. 3 to 5, provided in the pressure arm 36 itself is an internal thread 82 in which an external thread 84 of the plunger 42 engages so that the internal thread 82 of the pressure arm 36 and the external thread 84 of the plunger 42 together form a threaded guide 86 by means of which the plunger 42 is rotatable and displaceable in the direction of a longitudinal axis 88 thereof which is simultaneously the central axis of the threaded guide 86, in order to be able to set the spacing of the plunger head 58 from the pressure arm 36.

In order to turn the plunger 42, it is provided at its end remote from the plunger head 58 with a rotary control element 92 which is held non-rotatably on an end portion 94 of the plunger 42 opposite to the plunger head 58.

The threaded guide 86 and the pressure arm 36 thus lie between the plunger head 58 and the rotary control element 92.

Figure 6:
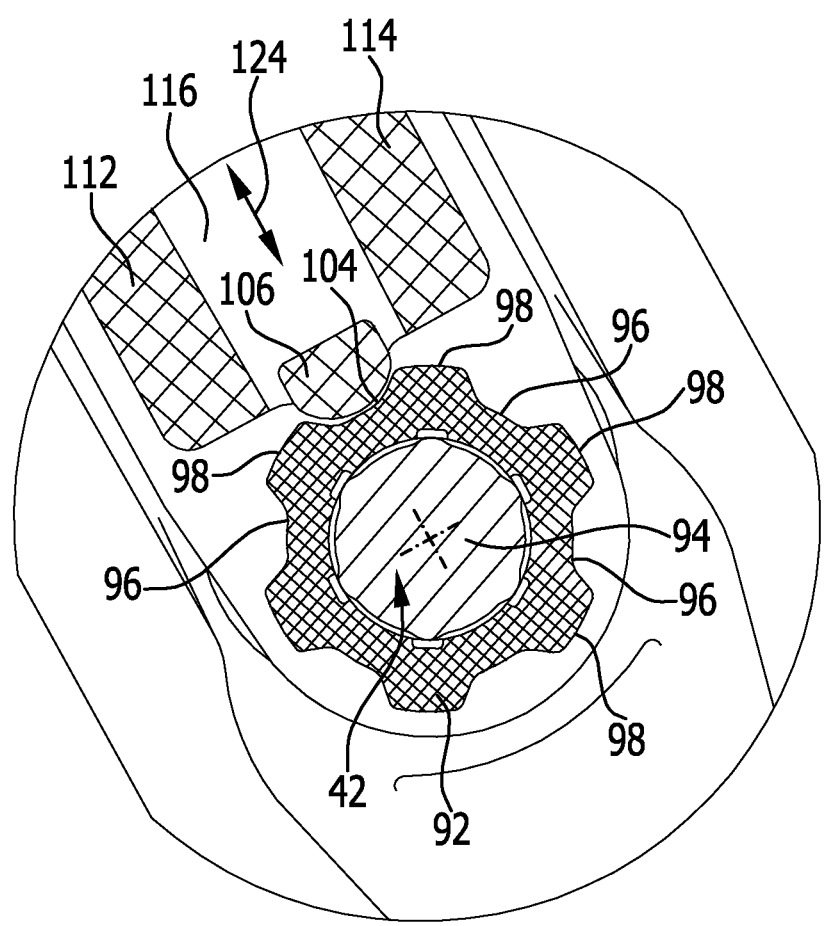
FIG. 6 shows a section along the line 6-6 in FIG. 5.

The rotary control element 92 is herein provided peripherally, as shown in FIGS. 5 and 6, with grip recesses 96 which lie respectively between raised portions 98 of the rotary control element 92.

Due to the arrangement of the internal thread 82 of the threaded guide 86 directly in the pressure arm 36, the orientation of the longitudinal axis 88 of the plunger 42 relative to the actuating lever 22 is also pre-determined, so that the plunger 42 is always oriented in a defined manner relative to the actuating lever 22 and particularly also to the handle arm 26.

For this reason, the plunger head 58 is preferably provided with the rounded head surface 64 which acts on the pressing surface 56 of the piston 48.

In order to prevent the free rotatability of the plunger 42 in the threaded guide 86, a locking element 102 is preferably provided which has a locking nose 104 which can be brought into engagement with the grip recesses 96 of the rotary control element 92 in order thereby to fix the rotary control element 92 in a rotary position.

The locking nose 104 is herein preferably mounted on a tongue 106 which is elastically movable relative to the actuating lever 22, particularly relative to the handle arm 26 of the actuating lever 22.

In the exemplary embodiment shown, the actuating lever 22 is provided in the region of the handle arm 26 with a recess 116 lying between side cheeks 112 and 114 of the handle arm 26, and extending as far as the tongue 106 with the locking nose 104, wherein a U-shaped slit 118 which extends round the tongue 106 and the locking nose 104 is provided which frees the tongue 106 with the locking nose 104, so that consequently the tongue 106 is connected on one side only by a tongue root 122 to the handle arm 26 (FIG. 3) and thus can move resiliently in a springing direction 124 in the recess 116, particularly thereinto.

This design enables the tongue 106 with the locking nose 104 to be configured as one part integrally with the handle arm 26 if the actuating lever 22 is manufactured, for example, with the handle arm 26 as a plastics part.

If, however, the actuating lever 22 is configured with the handle arm 26 as a metal part, the tongue 106 bearing the locking nose 104 is to be configured as a resilient element and is to be connected to the actuating lever 22, in particular the handle arm 26.

By means of the locking of the rotary control element 92 in the different positions, a setting of the plunger 42 once pre-determined by means of the threaded guide 86 and thus the position of the piston 48 pre-determined by the plunger 42 in the starting position of the actuating lever 22 pre-determined by the reach adjust device 72 can thus be maintained without any change in the position of the plunger 42 taking place independently.

In this way, in particular, adaptations of the master cylinder 44 to slave-side changes, for example, changes of brake linings through wear can be carried out.

As mentioned above, with the transmitter unit 10 according to the invention, by means of the reach adjust device 72 in cooperation with the contact arm 66, the starting position of the actuating lever 22 and thus a reach, that is, the spacing of the handle arm 26 from the handlebar 12 can also be set.

Figure 7:
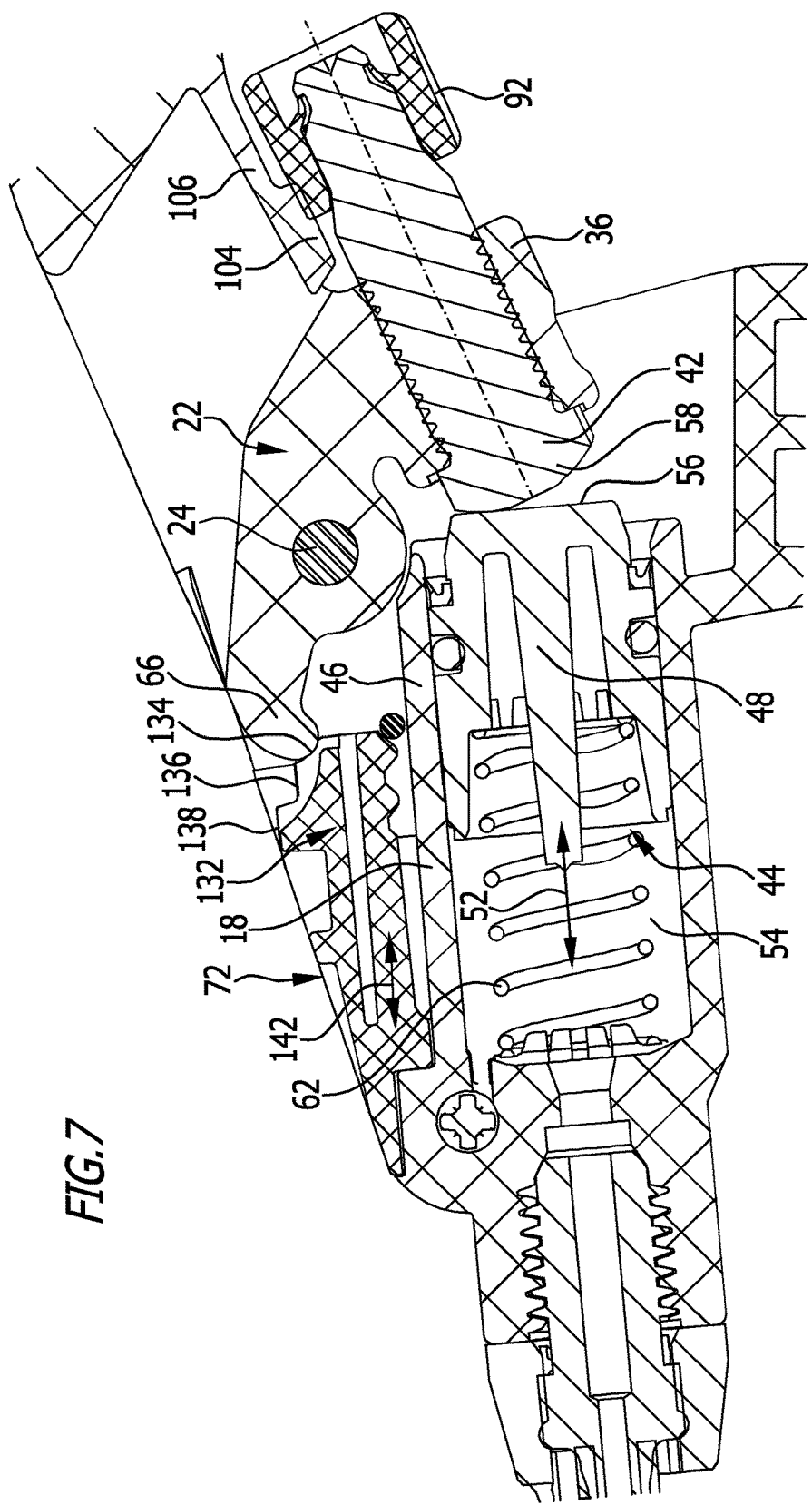
FIG. 7 shows an enlarged longitudinal section similar to FIG. 2 through a housing of the transmitter unit together with part of the actuating lever and a plunger provided thereon and a reach adjust device in a position corresponding to a maximum reach.
Figure 8:
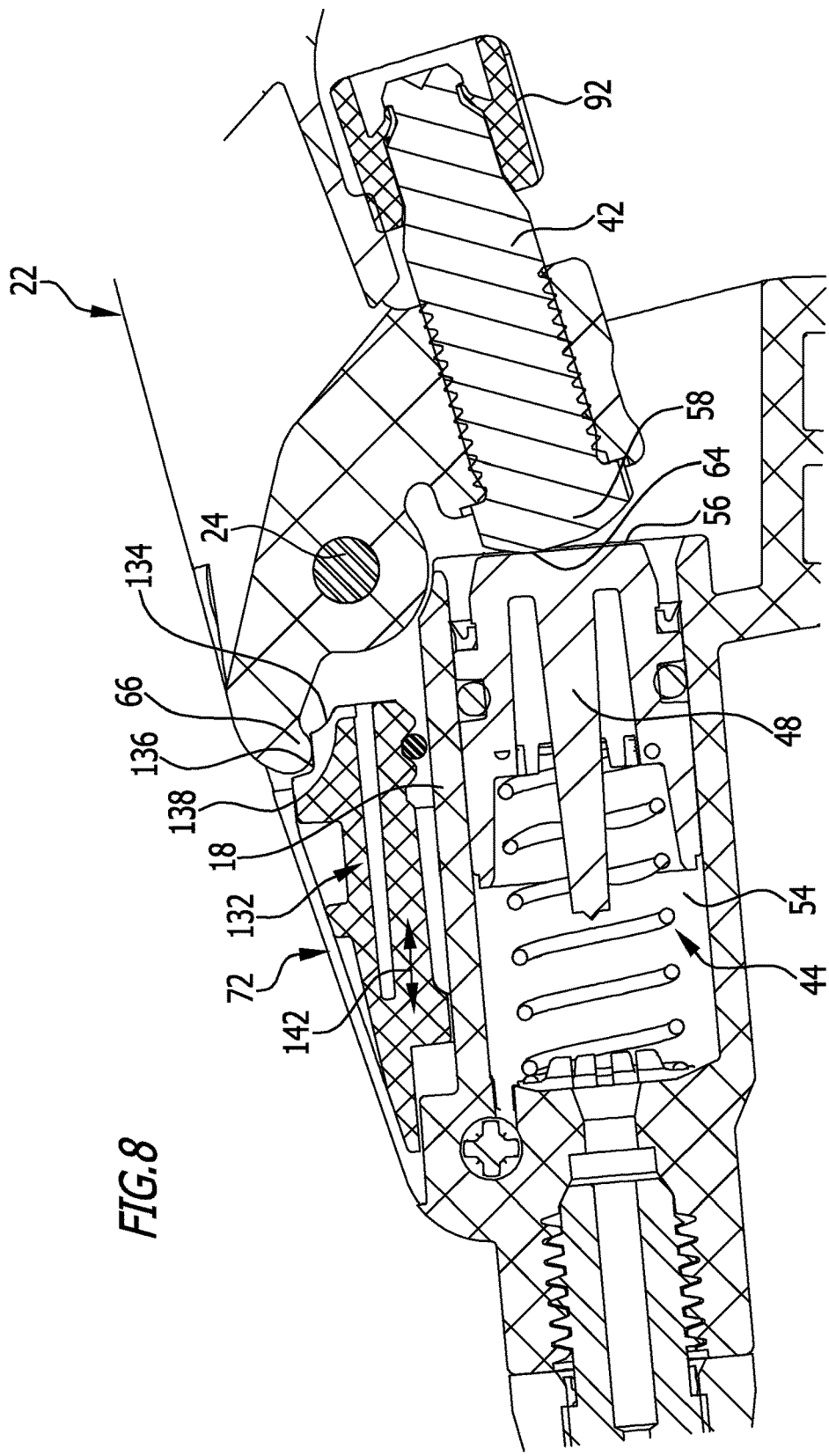
FIG. 8 shows a section according to FIG. 7 with the reach adjust device in a position corresponding to a relatively small reach.
Figure 9:
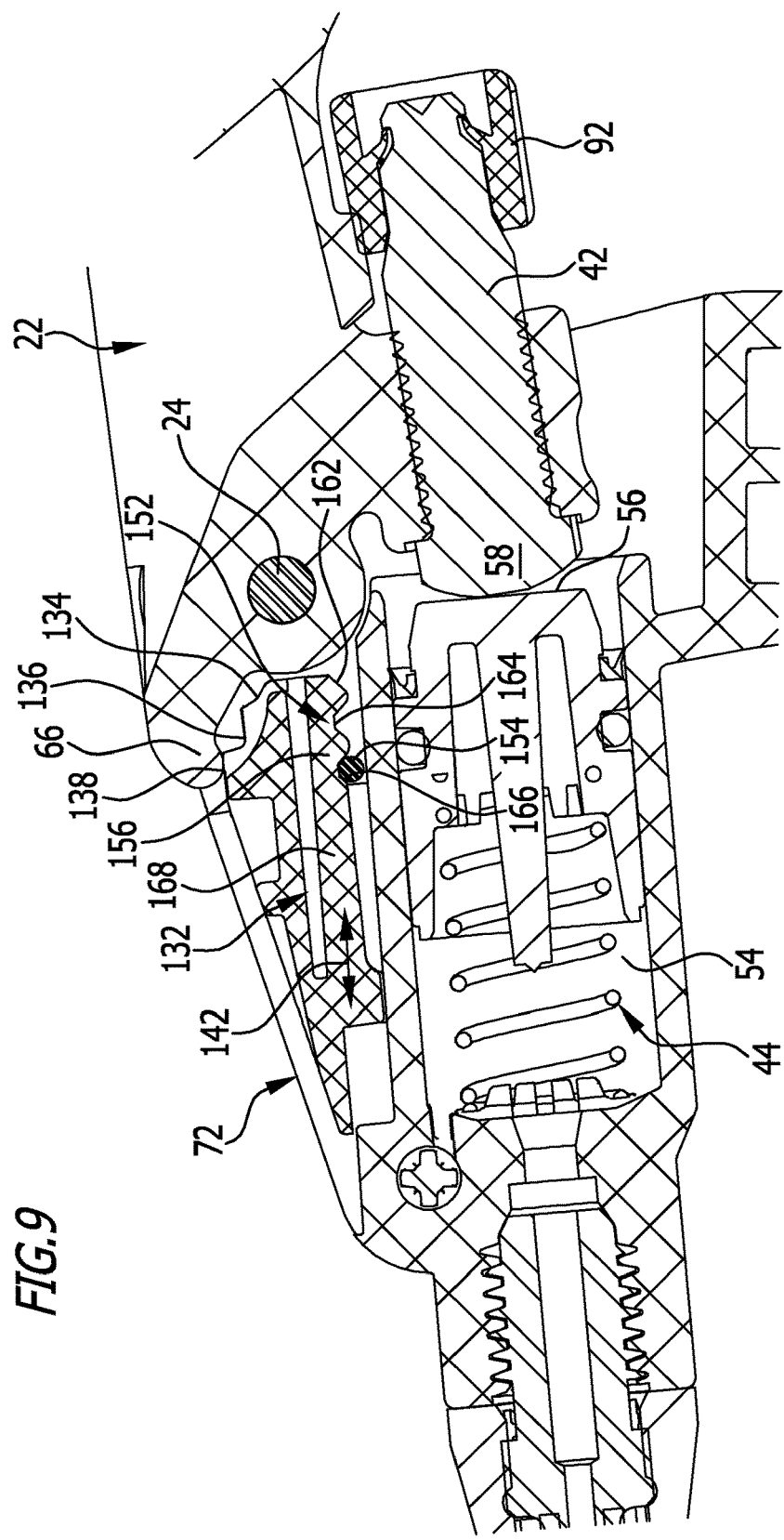
FIG. 9 shows a representation according to FIG. 7 with the reach adjust device in a position corresponding to a minimum reach.

For this purpose, as shown in FIGS. 7 to 9, arranged in the housing body 18 an adjustment element 132 is provided which is movable relative thereto and which, as shown enlarged in FIGS. 12 to 15, has altogether three stop surfaces 134, 136, 138, each of which can be brought by means of a movement of the adjustment element 132, for example, by means of linear displacement thereof in a displacement direction 142 into an active position in which said stop surfaces delimit a pivoting of the actuating lever 22 contrary to the actuating direction 32 in that the contact arm 66 comes to rest on the respective stop surface 134, 136, 138 which is in the active position, wherein by this means a fixing of the respective starting position of the actuating lever 22 takes place.

As shown in FIG. 7 and FIG. 2, a first stop surface 134 is provided for a maximum reach, that is, a maximum spacing of the handle arm 26 from the handlebar 12 and the contact arm 66 can be placed on said stop surface when the adjustment element 132 is situated in a first position in which it has a maximum spacing from the pivot axis 24, so that the contact arm 66 abuts on the first stop surface 134 lying closest to the pivot axis 24.

This first stop surface 134 is arranged so that it permits a starting position of the handle arm 26 which, relative to the pivot axis 24, represents a maximum angular spacing W1 from the holding unit 16, as FIG. 2 shows.

Figure 10:
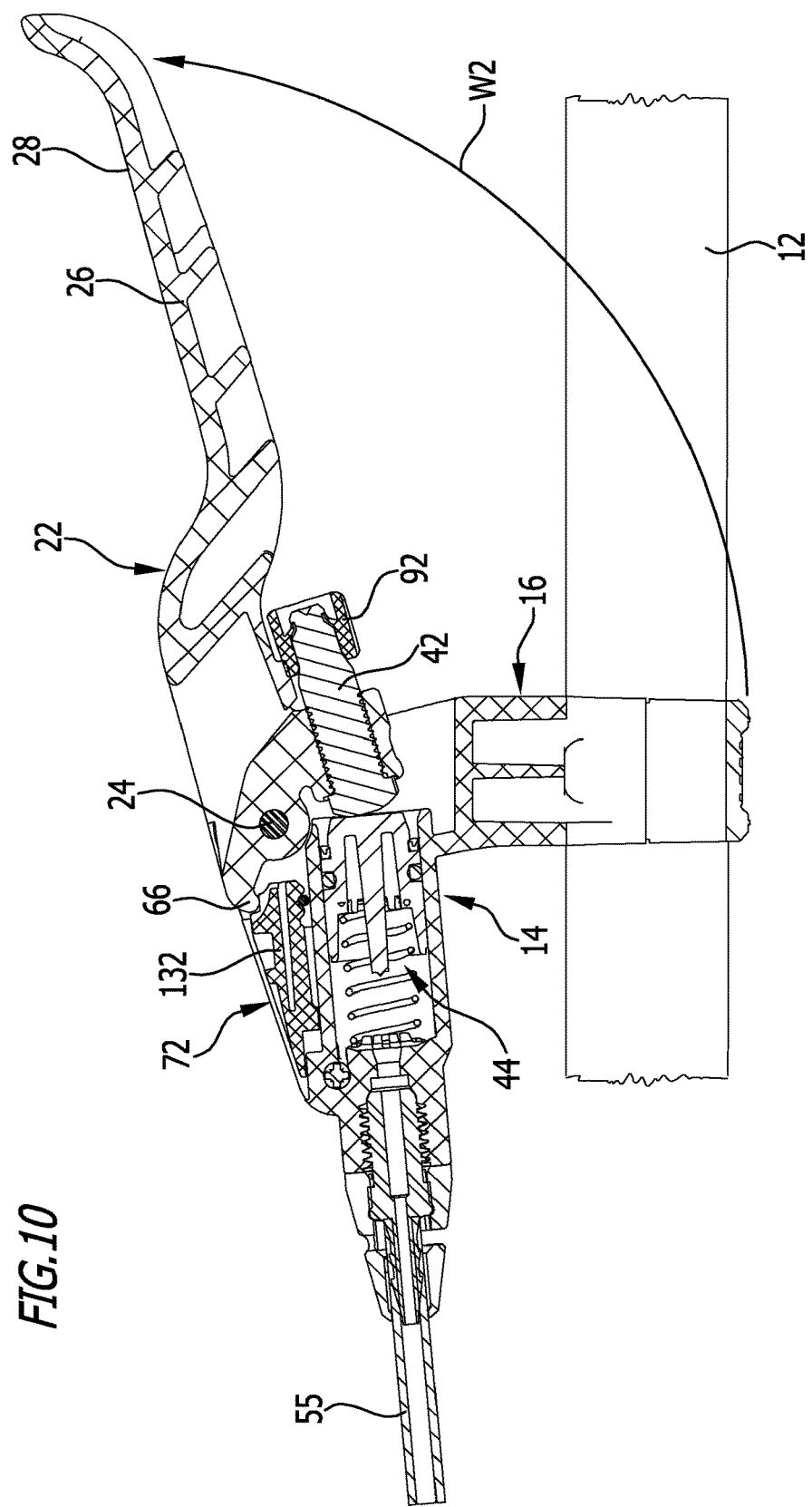
FIG. 10 shows a section similar to FIG. 2 in a position of the reach adjust device corresponding to a middle position according to FIG. 8.

The second stop surface 136 is effective when the adjustment element 132 is displaced, starting from the first position shown in FIGS. 7 and 2, into a second position shown in FIGS. 8 and 10 and lying closer to the pivot axis 24, so that the contact arm 66 abuts against this second stop surface 136, wherein this second stop surface is arranged so that when the contact arm 66 abuts thereon, the handle arm 26 has an angular spacing W2 from the holding unit 16 which is smaller than the angular spacing W1.

In order to move the third stop surface 138 into its active position, the adjustment element 132 is to be displaced in the direction of the pivot axis 24 far enough so that the adjustment element assumes the position closest to the pivot axis 24.

Figure 11:
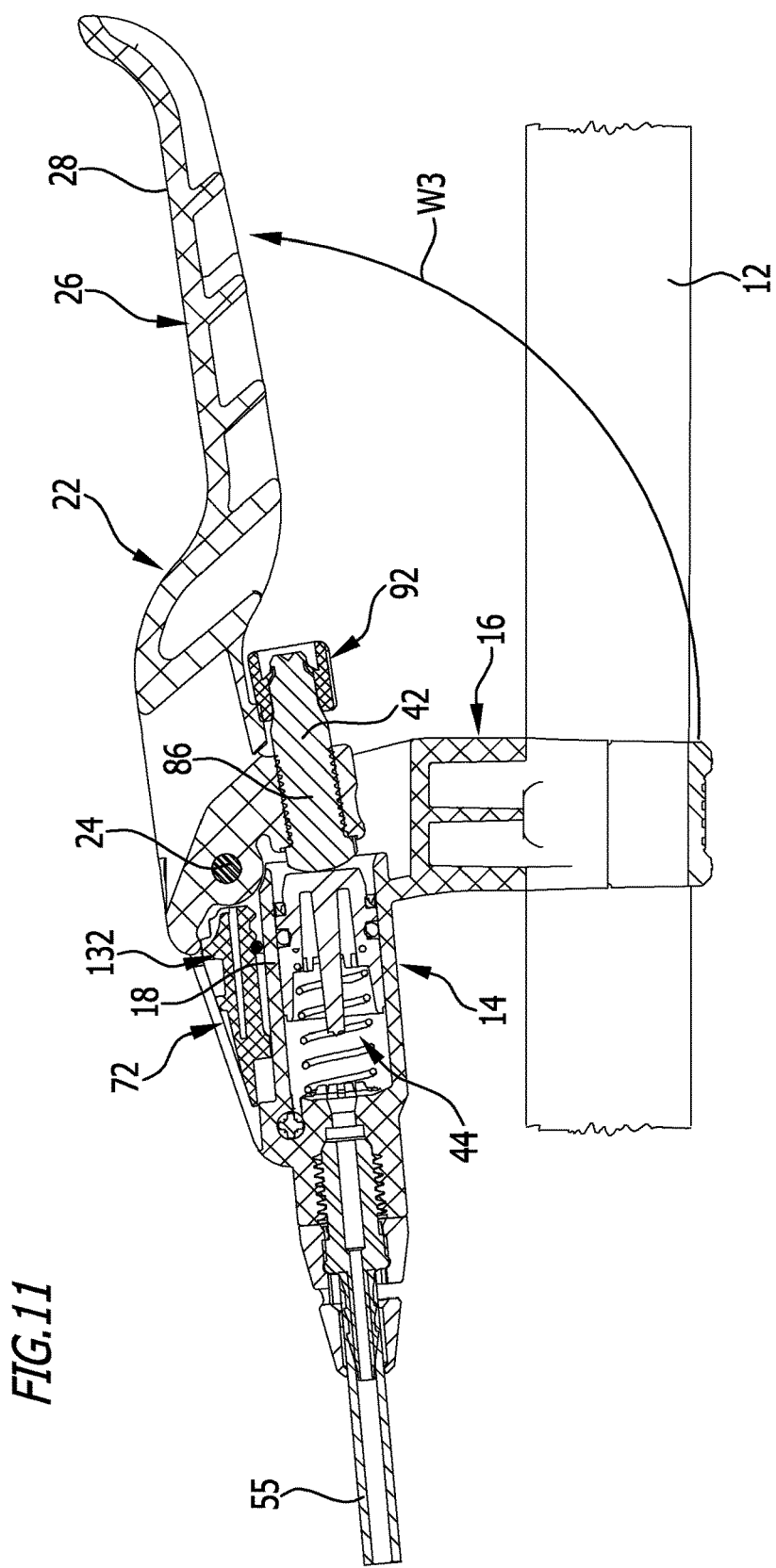
FIG. 11 shows a section similar to FIG. 2 in a position of the reach adjust device with a minimum reach according to FIG. 9.
Figure 12:
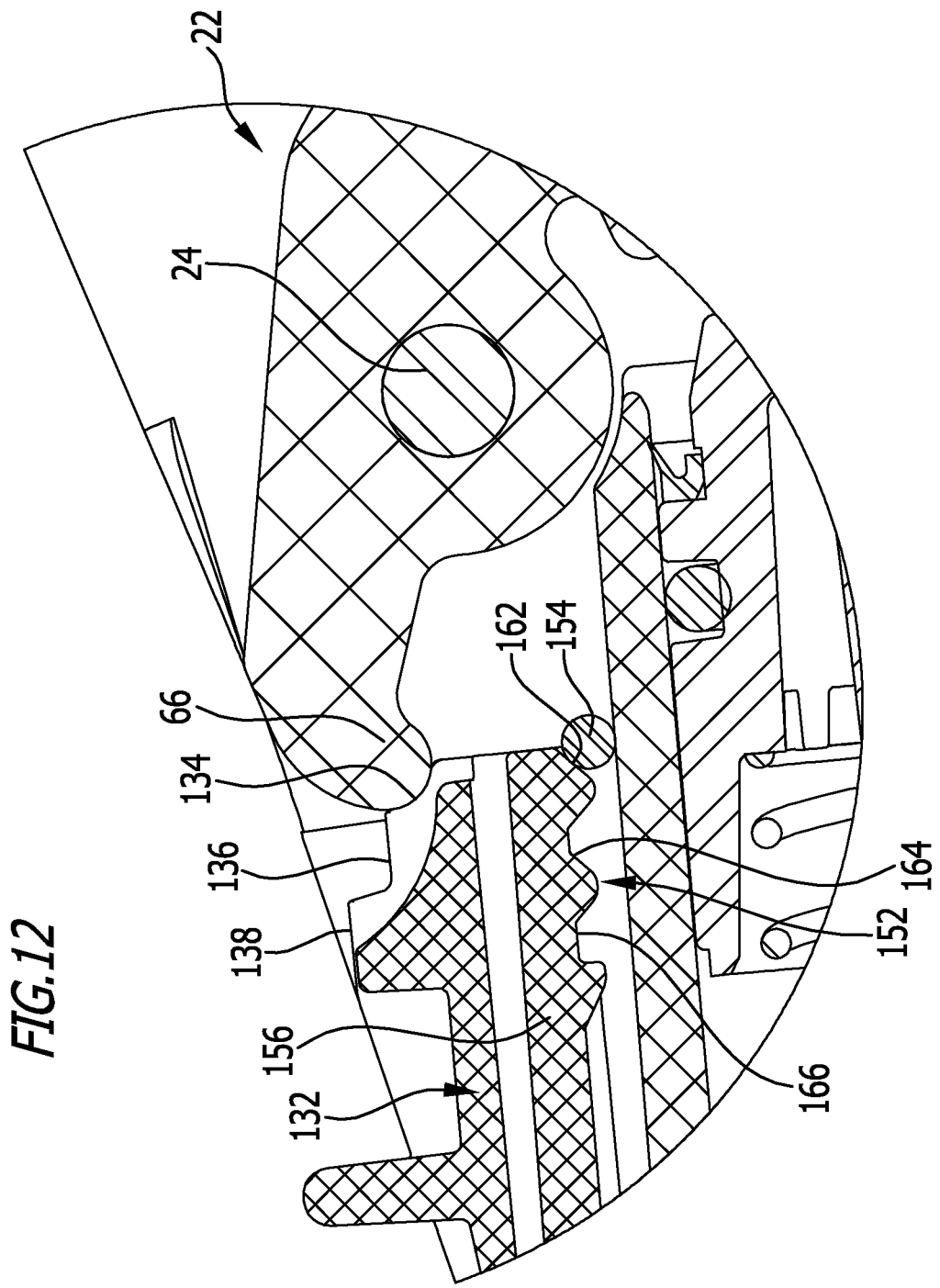
FIG. 12 shows an enlarged partial representation of the reach adjust device according to the position at maximum reach according to FIG. 7.
Figure 13:
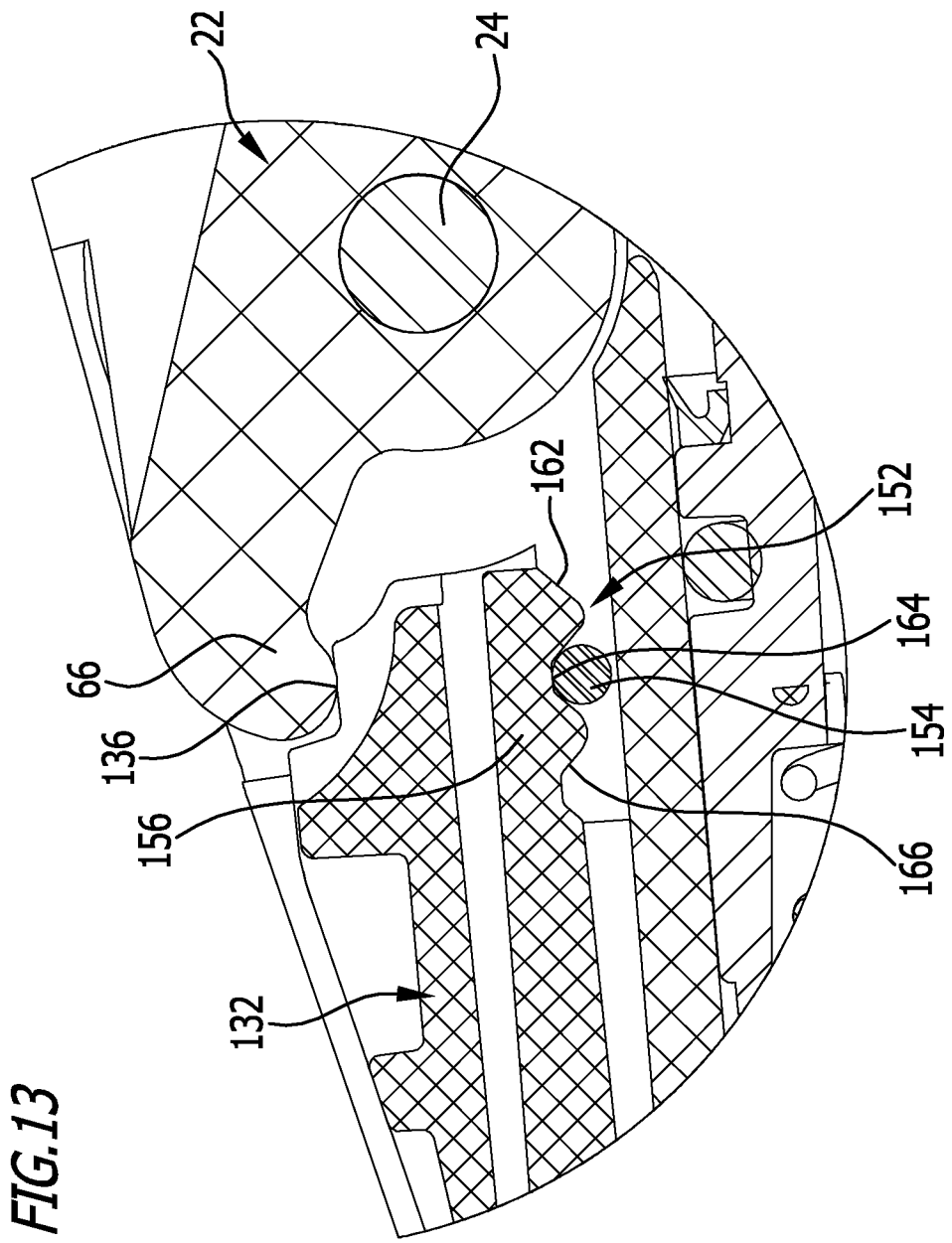
FIG. 13 shows an enlarged representation of the reach adjust device in a position corresponding to the middle reach according to FIG. 8.
Figure 14:
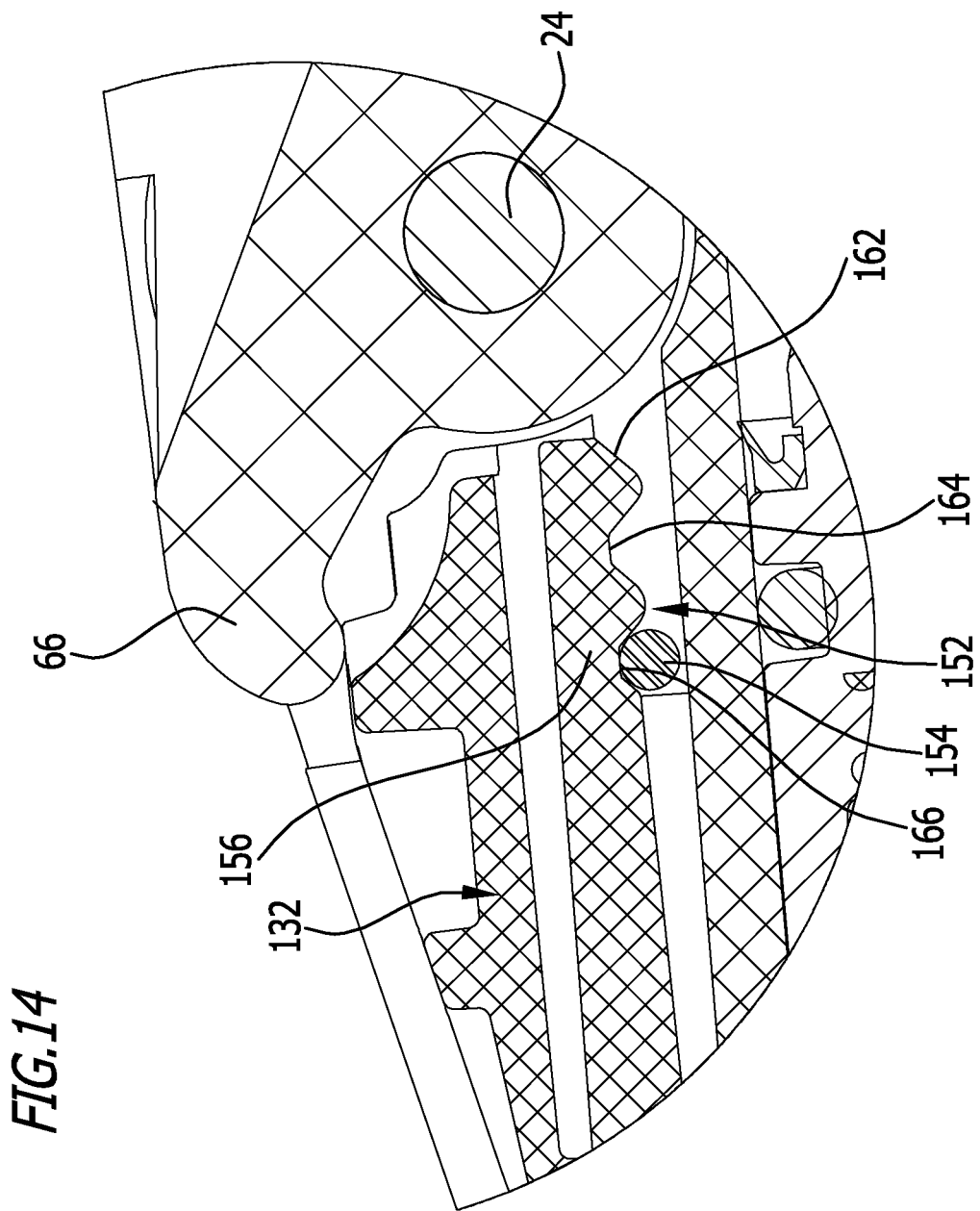
FIG. 14 shows an enlarged representation of the reach adjust device in a position corresponding to the minimum reach according to FIG. 9.

The third stop surface 138 is herein arranged so that the angular spacing W3 between the handle arm 26 and the holding unit 16 is smaller than the angular spacing W2 (FIGS. 9 and 11).

In order to be able to position the adjustment element 132 reliably in the different positions corresponding to the different angular spacings W1, W2, W3 in which the different stop surfaces 134, 136 and 138 are effective, the adjustment element 132 is lockable relative to the housing body 18 with a locking device identified overall as 152, as shown in FIGS. 12 to 16.

The locking device 152 herein comprises a first locking element 154 which is connected, for example, to the housing body 18 and can be configured as a cam or a pin, and comprises a second locking element 156 which has a plurality of locking surfaces 162, 164 and 166 with which the first locking element 154 can cooperate in order to fix the adjustment element 132 in the different positions corresponding, for example, to the angular spacings W1 or W2 or W3 relative to the housing body 18.

Preferably, the second locking element 156 is configured as a resilient tongue 168 formed onto the adjustment element 132.

Figure 15:
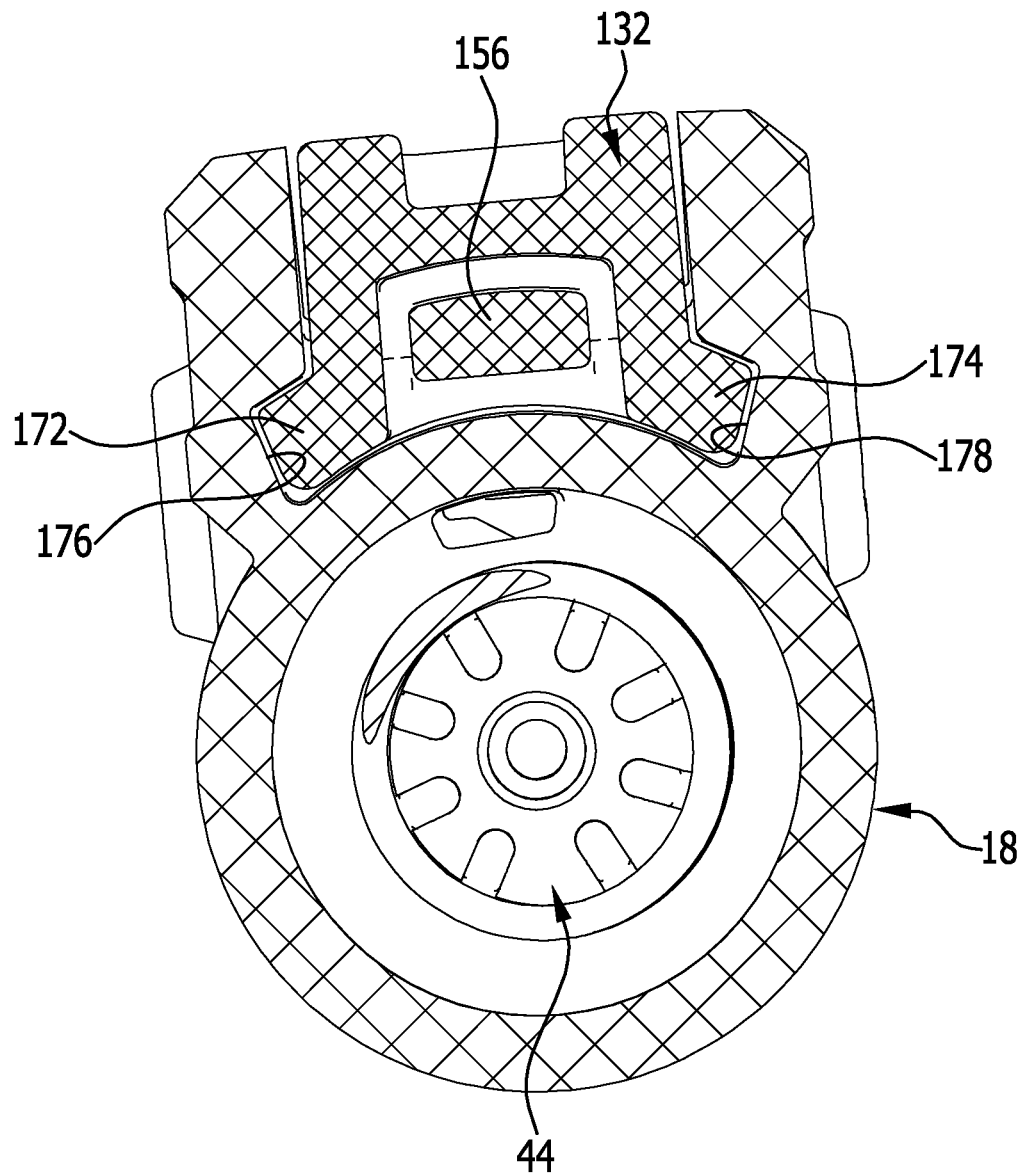
FIG. 15 shows a section along the line 15-15 in FIG. 1.

In order to guide the adjustment element 132 in the housing body, as shown in FIG. 15, provided lying laterally on the adjustment element 132 are guide bodies 172 and 174 which engage in corresponding guide grooves 176 and 178 of the housing body 18 and thus guide the adjustment element 132 displaceably in the displacement direction 142 between the different positions fixable by the locking device 152.

The invention claimed is:

1. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing, wherein said reach adjust device comprises an adjustment element displaceably mounted on the housing such that the adjustment element is movable back and forth with respect to a contact arm of the actuating lever, wherein the adjustment element is arranged on the housing on one side of the master cylinder, wherein the contact arm and the adjustment element are in contact in a non-actuated position of the actuating lever, and not in contact in an actuated position of the actuating lever.

2. Transmitter unit according to claim 1, wherein the adjustment element can be brought into different positions relative to a pivot axis of the actuating lever, having different spacings from the pivot axis, which define different starting positions.

3. Transmitter unit according to claim 1, wherein the adjustment element has at least one stop surface for the contact arm of the actuating lever.

4. Transmitter unit according to claim 1, wherein the adjustment element has different stop surfaces which are associated with different starting positions of the actuating lever.

5. Transmitter unit according to claim 4, wherein by means of the movement of the adjustment element, one of the respective stop surfaces is movable into an active position cooperating with the contact arm.

6. Transmitter unit according to claim 1, wherein the adjustment element is guided by means of a guide on the housing.

7. Transmitter unit according to claim 1, wherein the contact arm is movable together with the actuating lever with respect to the adjustment element upon actuating the actuating lever, and wherein the contact arm only rests upon the adjustment element in the non-actuated position for adjusting a position of said actuating lever.

8. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing, wherein said reach adjust device comprises an adjustment element displaceably mounted on the housing such that the adjustment element is movable back and fourth with respect to a contact arm of the actuating lever, wherein the adjustment element is arranged on the housing on one side of the master cylinder; and
wherein the adjustment element of the reach adjust device is fixable in the different positions by means of a locking device.

9. Transmitter nit according to claim 8, wherein the locking device comprises two cooperating locking elements of which one is connected to the housing and another to the adjustment element.

10. Transmitter unit according to claim 9, wherein a first locking element has a projection and that a second locking element has different locking surfaces for fixing the different positions of the adjustment element.

11. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing;
wherein an adjustment element of the reach adjust device is fixable in the different positions by means of a locking device;
wherein the locking device comprises two cooperating locking elements of which one is connected to the housing and another to the adjustment element;
wherein a first locking element has a projection and that a second locking element has different locking surfaces for fixing the different positions of the adjustment element; and
wherein one of the locking elements comprises a resilient tongue.

12. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing, wherein said reach adjust device comprises an adjustment element displaceably mounted on the housing such that the adjustment element is movable back and fourth with respect to a contact arm of the actuating lever, wherein the adjustment element is arranged on the housing on one side of the master cylinder;
wherein the adjustment element is guided by means of a guide on the housing; and
wherein the guide comprises guide bodies and guide grooves.

13. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing, wherein said reach adjust device comprises an adjustment element displaceably mounted on the housing such that the adjustment element is movable back and fourth with respect to a contact arm of the actuating lever, wherein the adjustment element is arranged on the housing on one side of the master cylinder;
wherein the adjustment element is guided by means of a guide on the housing; and
wherein the adjustment element is moveable by means of the guide in a guide direction approximately parallel to the master cylinder.

14. Hand-actuated transmitter unit for vehicles, comprising a housing, a master cylinder provided in the housing, a actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing, wherein said reach adjust device comprises an adjustment element displaceably mounted on the housing such that the adjustment element is movable back and fourth with respect to a contact arm of the actuating lever, wherein the adjustment element is arranged on the housing on one side of the master cylinder;
wherein the actuating lever is spring-loaded in the direction of the respective starting position and is thereby held in said position in the non-actuated state.

15. Transmitter unit according to claim 14, wherein the actuating lever is acted upon by the master cylinder in the direction of the starting position.

16. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, the plunger being adjustable relative to the actuating lever by means of a threaded guide, the threaded guide comprises an external thread provided on the plunger, said thread engaging in an internal thread arranged statically on a pressure arm of the actuating lever, the plunger comprises a rotary control element and arranged on the actuating lever is a first locking element which cooperates with a second locking element provided on the plunger and defines individual rotary positions of the plunger, the second locking element rotatable together with the plunger, wherein the individual rotary positions are discrete pre-defined positions.

17. Transmitter unit according to claim 16, wherein the second locking element is connected to the rotary control element.

18. Transmitter unit according to claim 16, wherein the second locking element is formed onto the rotary control element.

19. Transmitter unit according to claim 16, wherein the second locking element is formed by the rotary control element itself.

20. Transmitter unit according to claim 16, wherein the first locking element comprises a locking nose.

21. Transmitter unit according to claim 20, wherein the first locking element is formed integrally onto the actuating lever.

22. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, the plunger being adjustable relative to the actuating lever by means of a threaded guide, the threaded guide comprises an external thread provided on the plunger, said thread engaging in an internal thread arranged statically on a pressure arm of the actuating lever, the plunger comprises a rotary control element and arranged on the actuating lever is a first locking element which cooperates with a second locking element provided on the plunger and defines individual rotary positions of the plunger, the second locking element rotatable together with the plunger;
    wherein the first locking element comprises a locking nose; and
    wherein the first locking element comprises a resilient tongue which carries the locking nose.

23. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, the plunger being adjustable relative to the actuating lever by means of a threaded guide, the threaded guide comprises an external thread provided on the plunger, said thread engaging in an internal thread arranged statically on a pressure arm of the actuating lever, the plunger comprises a rotary control element and arranged on the actuating lever is a first locking element which cooperates with a second locking element provided on the plunger and defines individual rotary positions of the plunger, the second locking element rotatable together with the plunger;
    wherein the first locking element comprises a locking nose; and
    wherein the first locking element is movable into a recess of the actuating lever.

24. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing, wherein the reach adjust device comprises an adjustment element which is movable on the housing, the adjustment element being displaceably arranged on the housing, such that it can be brought into different positions relative to a pivot axis of the actuating lever, having different spacings from the pivot axis, which define different starting positions, wherein the adjustment element has at least one stop surface for a contact arm of the actuating lever, wherein the contact arm and the adjustment element are in contact in a non-actuated position of the actuating lever, and not in contact in an actuated position of the actuating lever.

25. Transmitter unit according to claim 24, wherein the contact arm is movable together with the actuating lever with respect to the adjustment element upon actuating the actuating lever, and wherein the contact arm only rests upon the adjustment element in the non-actuated position for adjusting a position of said actuating lever.

26. Hand-actuated transmitter unit for vehicles, comprising a housing, a master cylinder provided in the housing, an actuating lever which is movable relative to the housing and a plunger which transmits a movement of the actuating lever to the master cylinder and which is mounted on the actuating lever, further comprising a reach adjust device for the actuating lever with which a respective starting position of the actuating lever is pre-settable, wherein said reach adjust device is movably mounted on the housing, wherein said reach adjust device is linearly movable with respect to the housing in a direction which is parallel to a direction of movement of a piston within a cylinder housing of said master cylinder.

* * * * *